3,282,701
PROCESS FOR PREPARING FOODSTUFF INTERMEDIATES IN CHIP FORM
Benjamin Wong and Joe H. Wong, both of 118 12th Ave., Rochester, Minn.
No Drawing. Filed Mar. 30, 1965, Ser. No. 444,041
5 Claims. (Cl. 99—1)

The present application is a continuation in part of application Serial No. 270,820, filed April 5, 1963, and entitled "Chips" now abandoned.

The present invention relates to puffed foodstuffs, to dehydrated, unpuffed, intermediates for such foodstuffs, and to methods for making the same.

While the art has long appreciated that fried, crispy food products in a puffed or expanded state can be made by immersing into hot, edible oil a starch-containing intermediate chip-shaped product having a controlled moisture content, such puffed food products heretofore known have suffered from a number of disadvantages. Thus, the puffed chips made from cooked corn starch dough and tapioca flour as described in U.S. Patent 1,926,347 suffer from the disadvantage that it is very difficult, if not impossible, to prepare these chips so that individual chips have a uniform, even, wholly unburned texture. Similarly, chip products made as described in Shephard U.S. Patent 2,168,246 puff irregularly and incompletely and the individual cells in a chip tend to be excessively large in relation to product size.

In general, the puffed chips of the prior art all have a characteristically high fat content owing to grease or oil retention during the final frying process.

After extensive experimentation we have now discovered how to prepare puffed, fried, crispy, starch-based food products having a much improved texture, physical appearance, and palatability compared to all known similar prior art products. Furthermore, our puffed products have an unexpectedly low grease pickup during frying.

Briefly, the present invention involves the preparation of an aqueous, homogeneous mixture containing specified amounts of starch having a protein content of less than 5% (based on total starch weight), egg whites, baking powder, and inert additives. This mixture is then subjected to certain critical processing steps which result in dehydrated, unpuffed, chip-shaped, intermediate, edible food products which can be stored, shipped, and otherwise easily handled. Then, to make the final puffed, chip-shaped and chip-like foodstuffs of this invention, one immerses the intermediate products in an edible hot oil maintained at a temperature of at least 350° F. and generally less than 400° F. for a period of time not exceeding 10 seconds and usually less than 5 seconds.

The principal ingredient in the food products of this invention is starch, either by itself or in combination with flour. The term "starch" as used herein is generic to both the naturally occurring, high polymeric carbohydrate composed of glucopyranose units and flours containing such carbohydrate, unless the context indicates otherwise. While any form or type of starch is apparently useful in this invention, it is preferred to use a starch or starch-flour combination which has a protein content not greater than about 5 wt. percent in making the products of this invention. Most preferably, we like to use tapioca flour in combination with wheat starch. It will be appreciated, however, that any starch can be used such as corn starch, wheat starch, potato starch, soy bean starch, or the like. Similarly, any flour can be used such as wheat flour, rice flour, soy bean flour, barley flour, arrowroot flour, and the like. Since wheat flour, for example, commonly has a protein content in the neighborhood of 10 to 14 wt. percent, it is desirable to add sufficient starch to wheat flour, for example, corn starch, to lower the percentage of protein to a level below that indicated above or about 5 wt. percent.

Also used in the products of this invention are egg whites which are an albumeniferous material. As used, the egg whites can either be freshly prepared or in dry form. As those skilled in the art will appreciate, freshly prepared egg whites normally contain from about 75 to 85% water; although, in the case of chicken eggs, the percentage of water present is reported in the literature to be commonly approximately 80.3 wt. percent. At any rate, for purposes of this invention, we frequently find it convenient to express the percentage of egg whites present in a given product in terms of dry or dehydrated egg whites.

Another component used in the products of this invention is conventional baking powder, which as those skilled in the art know, consists largely of sodium bicarbonate and potassium hydrogen tartrate or an acid phosphate and has a standard capacity to release carbon dioxide in the presence of heat.

In addition to starch, egg whites, and baking powder, various inert additives are employed in the food products of this invention. These additives are inert in the sense that they do not appreciably contribute to the process of manufacturing or forming the products of this invention. Rather, these additives are used largely for purposes of flavoring, coloring, preserving, or otherwise adding specific desired properties to the final products. Virtually any flavoring or coloring agent can be used to impart any particular desired gustatory appeal to the final products of this invention. No particular limits are known to us concerning the variety and/or type of conventional flavoring or coloring agents used in the products of this invention.

Similarly, any of the well-known, accepted, various preservatives, including antioxidants, can be employed. As these inert additives do not form a part of this invention and their use is well known to those skilled in the art, they are not described in detail herein.

In general, to prepare intermediate products of the invention from the starting materials, one makes an aqueous, homogeneous mixture containing, for each quart of water, the following quantities of components (dry weight basis):

| | Oz. |
|---|---|
| Starch having a protein content of less than 5% (based on total starch weight) | 25 to 45 |
| Egg whites | 0.2 to 1.0 |
| Baking powder | 0.3 to 1.0 |
| Inert additives | 3.0 to 10.0 |

This homogeneous mixture can be prepared in either of two different ways. Following one procedure, the starch is first gelatinized and then mixed with the other additives. For example, when wheat starch is employed, the wheat starch is added to boiling water or vice versa to produce a mixture which is at least 50% transparent to ordinary light and, preferably, 75% transparent to ordinary light. The water should be maintained at the boiling point until the desired translucent or transparent condition is produced in the resulting mixture. A convenient rule of thumb is to maintain the weight ratio of starch to water during this gelatinization step in the range of from about 2:1 to 1:1.5.

In a separate mixing operation, egg whites and inert additives are mixed together thoroughly. The inert additives include flavorings such as shrimp, onion, etc., and other common materials such as salt, monosodium glutamate, gums, antioxidants, etc. When the additives are insoluble in the system, they are used initially in a very finely divided state so that when incorporated into the aqueous, homogeneous mixture such solid materials are generally uniformly distributed thoughout the mixtue and they do not substantially affect the homogeneity of the system. Within the limits above indicated, the amount and type of flavorings used is determined by the wishes of the user. Especially when the egg whites are in powdered form, it is convenient to add a small amount of water so as to aid in forming a generally uniform mixture of the egg whites with the flavoring and other miscellaneous inert additives. After formation, the mixture of egg whites and flavoring is combined wit hthe mixture of gelatinized starch and water.

Those skilled in the art will appreciate that there are certain types of starch now on the market which gelatinizes even in cold water. It is sometimes convenient to use these starches which then avoids the necessity of boiling water in order to gelatinize the starch starting material.

As a separate operation, a mixture of the flour to be used with the starch, if such is to be employed with the starch, is prepared by blending the flour with the baking powder. For example, when tapioca flour is employed, the tapioca flour is blended with the baking powder. In a preferred embodiment of the invention, the amount of tapioca flour used is approximately equal to that of the amount of starch employed, such as wheat starch. As a convenient rule of thumb, we have found it suitable to employ an amount of baking powder approximately equal to the weight of egg whites used, computing the weight of egg whites on a dry basis, though it will be appreciated that the weight of baking powder employed can be more or less than the amount of dry egg whites used. After the mixture of flour and baking powder is prepared, the same is then added to the gelatinized starch-water mixture above described. We have found it convenient to have at this point approximately, as a rule of thumb, a 1:1 ratio of starch to water. It may thus be necessary to adjust the relative proportions of the materials used as by adding water, for example, in order to achieve such a ratio. There is thus developed or produced the homogeneous mixture referred to above.

The second method of making such homogeneous mixture involves no gelatinization of the starch initially. Instead, the starch is mixed with cold water and then the egg whites, baking powder, and inert additives are added to this resulting nongelatinized starch-water mixture to produce a generally fluid combination of batter-like consistency.

When the second method of preparing the aqueous, homogeneous mixture is used, such product intermediate mixture can be directly further processed as by pouring the batter into molds and then heating the resulting molded batter at a temperature of from about 150° to 212° F. until the batter-like mixture in the molds becomes a self-supporting dough having a generally translucent appearance. While the molds used can have any conventional shape, we generally find it conventional to employ hemispherically-shaped molds having a diameter of from about 1 to 2 inches.

When the homogeneous, aqueous mixture is produced by the first described process, it is necessary to knead the mixture into a pliable, doughy mass of putty-like consistency after which the produced doughy mass is heated at a temperature of from about 150° to 212° F. until such mass assumes a translucent appearance approaching that of the original gelatinized starch solution.

In both cases, it is generally convenient to conduct the heating step upon a steam table. During the heating step, the doughy mass produced by the first step above described slightly increases in weight.

Preferably, the amount of starch employed in the first procedure for preparing the aqueous, homogeneous mixture is less than the amount employed in the second procedure. In the first procedure it is convenient to employ from about 25 to 32 oz. of starch for each quart of water; whereas in the second procedure it is convenient to employ from about 32 to 45 oz. of starch for each quart of water used.

At the end of the heating step, the product dough, whether produced by the first or the second step above described, is shaped into a desired form. We have generally found it convenient to shape our dough into cylindrically shaped masses of from about 1 to 2 inches in diameter. Preferentially, such cylindrical masses are formed prior to the heating step.

The dough is now subjected to a cooling period during which the moisture content of the dough is carefully regulated to insure uniform drying throughout. Preferably, the dough is placed in a cool chamber or a refrigerator maintained in the temperature range of from about 34° to 40° F. until the dough loses not more than about 10 wt. percent of its initial weight prior to refrigeration. During this period, the atmosphere surrounding the dough is maintained at a humidity level equivalent to that achieved by covering the dough with a damp muslin cloth which is in turn generally equivalent to a relative humidity between 55 and 85%. Indeed, it is a preferred manner of practicing the invention to actually cover the dough with a damp muslin cloth; that is, a muslin cloth which has been moistened with water at room temperature, initially, and then covering the dough with such cloth. While the time of refrigeration will vary, we have empirically determined the following relationship between time and refrigeration temperature.

| Temperature: | Time, hours |
|---|---|
| 34° F. | About 9. |
| 36° F. | About 12. |
| 40° F. | 24–39. |

While this step is generally referred to as a refrigeration step because it is preferably performed at relatively low temperatures the process will operate if the dough is aged at any temperature up to and including room temperature. However, the lower temperatures are more practical since the aging time is much shorter and the humidity can be kept higher more easily.

Promptly following the refrigeration step just described, the dough is cut into chip-like shapes. Each such shape has an average thickness not greater than about 3/16 inch in at least one dimension. Thus, when the dough has been initially formed into cylinders of from about 1 to 2 inches in diameter, the chip-like structures so-formed are disc-shaped.

After formation of the chip-like structures, they are dried in an inert gaseous atmosphere such as air at a temperature below about 125° F. until such chip-like structures have a generally brittle consistency. It is believed that the moisture content in these chips is generally greater than about 8% being in the neighborhood of about 10%. The dry chips constitute the intermediate product of the invention and have a generally translucent appearance. To prepare the puffed or popped food products of the invention, these dry chips are immersed into a hot, edible oil maintained at the temperature of at least 350° F. for a period of time generally not exceeding about 5 seconds. Temperatures of below about 400° F. are generally preferred.

Frying time is usually less than about 10 seconds. We have observed that frying times of approximately 5 seconds are best. The fried product has a light, crisp physical appearance and a generally golden brown color. Aside from the particular inert additives employed, the product fried has a pleasant, agreeable sensation to the palate. The products are of generally uniform consistency and have a plurality of fine cells; these cells appear to have average diameters of less than 1 mm. The cells are of very uniform diameter. Individual cells deviate from one another in a given batch only very slightly.

It is an unusual feature of the products of this invention that their grease or oil take up during the final step is very slight, thereby making it possible to use the same oil for frying an indefinite number of times without replenishment. Furthermore, the products have a low calorie content—a factor of importance in today's calorie-conscious consumer market.

Assuming no inert additives are employed which deteriorate with time, the intermediate food products produced in accordance with the teachings of this invention can be stored for an indefinite period of time without product deterioration. Similarly, it is a characteristic of the fried products of this invention that they have an unusually long storage period without quality deterioration as compared with known prior art products.

The following examples further illustrate the invention. Those skilled in the art will readily appreciate that modifications and changes can be made in these examples without departing from the spirit and scope of the invention.

*Example 1.*—To 16 oz. of wheat starch is added slowly with mixing 28 oz. of preheated boiling water. The mixture is stirred until it is at least 50% transparent and, preferably, at least 75% transparent to ordinary light; the mixture itself is no heated.

In a separate mixing operation, 9 oz. of fresh egg whites (1.8 oz. dry weight basis assuming the water content of fresh eggs to be 80%) and additives are mixed together thoroughly. The additives consist of 1½ oz. salt, ½ oz. monosodium glutamate, and 4 oz. fresh shrimp in a finely divided form. The resulting mixture of egg whites and additives is then combined with the gelatinized starch-water mixture.

Next, a mixture of 16 oz. of tapioca flour and 1 oz. of baking powder is formed and then the dry mixture is added to the gelatinized starch mixture.

The resulting conglomerate mixture of step 3 is kneaded to form a pliable, doughy mass of putty-like consistency which can be formed into shapes which are generally self-supporting. Thereafter, the dough is formed into rolls approximately an inch and a half in diameter and the so-shaped dough is placed in a steam chamber and maintained at a temperature in the range of from about 150° to 212° F. until the rolls have a semi-transparent condition associated with the gelatinized starch-water mixture initially prepared. Usually about 15 to 20 minutes are required for this steaming operation.

After steaming, the dough shapes are removed from the steam chamber and cooled to room temperature. The so-cooled shapes are then placed under refrigeration. A damp cloth (room temperature) is placed over the shapes during the refrigeration. The shapes are maintained at approximately 36° F. for 12 hours. Thereafter, the shapes are weighed and it is seen that the shaped dough has lost about 2 oz. compared to the original weight.

Next, the steamed, cooled shapes are cut into slices which do not exceed 3/16 of an inch in maximum thickness. These slices are then air dried at room temperature until they achieve a brittle consistency. Drying temperature is maintained at about 90° F.

It is observed that the so-dried slices can be stored indefinitely. When it is desired to form final products of the invention, the dried slices are inserted into an oil bath maintained at a temperature in the range of from about 360° to 370° F. In a period of time, usually less than about 10 seconds, the individual slices completely pop or puff, usually from the outside edge of the slice inward toward the center. The popped or puffed slice has a thickness of approximately four times that of the original slice. It is observed that during the final cooking the chips absorb very little of the hot oil as demonstrated by the fact that the same oil can be used without replenishment to cook an indefinitely large number of chips.

*Examples 2–7.*—In the following examples, the same procedure as described in Example 1 is used to prepare products of the invention except that for each of the indicated ingredients used in the product described in Example 1, there is employed the indicated quantities of materials. The results are summarized in Table I below.

TABLE I

| Example No. | Amount of boiling water in ounces | Material used in place of Ex. 1 Wheat Starch | | Material used in place of Ex. 1 Tapioca Flour | | Amount of egg white (fresh) in ounces | Amount of baking Powder in ounces | Additives | |
|---|---|---|---|---|---|---|---|---|---|
| | | Type | Amount in ounces | Type | Amount in ounces | | | Type | Amount in oz. |
| 2 | 28.0 | Wheat | 12.0 | Tapioca | 12.0 | 3.9 | .95 | Salt | 1.5 |
| | | | | | | | | Shrimp | 1.0 |
| | | | | | | | | Monosodium Glutamate | .5 |
| 3 | 28.0 | Instant Corn [3] | 16.0 | Tapioca | 16.0 | 9.0 | .95 | Salt | 1.5 |
| | | | | | | | | Shrimp | 1.0 |
| | | | | | | | | Monosodium Glutamate | .5 |
| 4 | 20.0 | Corn | 16.0 | | | 3.2 | .5 | Cheese | 1.0 |
| | | Wheat | 8.0 | | | | | Salt | 1.5 |
| | | | | | | | | Monosodium Glutamate | .5 |
| 5 [1] | 2.0 (cold) | Instant | 2.0 | | | .8 | .06 | Shrimp | .05 |
| 6 | 28.0 | Potato | 16.0 | Tapioca | 14.0 | [2] 1.8 | 1.0 | Salt | 2.0 |
| 7 | 32.0 | Potato | 16.0 | | | 1.8 | 1.0 | Salt | 1.0 |
| | | Wheat | 16.0 | | | | | | |

[1] The starch here employed gelatinizes on contact with water so that there is no need to use boiling water in the initial gelatinization.
[2] Powdered egg whites are used here.
[3] This product gelatinizes in contact with cold water, i.e., room temperature.

*Example 8.*—Approximately 16 oz. tapioca, 16 oz. wheat flour, and 1 oz. baking powder are blended together to form a dry mixture. Then, to this mixture 16 oz. freshly boiled water (tap water), cooled to room temperature, is slowly added, stirring until a homogeneous batter is formed. To the batter is added 1½ oz. salt, 8 oz. dried shrimp, and ½ oz. monosodium glutamate, the batter being stirred so as to assure uniform mixing of the ingredients. Finally, there is blended into the batter 1.8 oz. (dry weight basis) of fresh egg whites (assuming the fresh eggs contain 80% water). The product batter is then poured into open-faced, hemicylindrical molds, each mold being about 1.5 inches across and 12 inches in length.

The batter and molds are then placed upon a steam table and heated at a temperature of from about 150° to 212° F. until a homogeneous, self-supporting dough having a translucent appearance is developed. The self-supporting, homogeneous dough is removed from the molds and cooled for 30 hours at 40° F. in a refrigerator. During this time the molded shapes are covered with a damp cloth. Thereafter, the shapes are weighed and it is seen that the shaped dough has lost about 2 oz. compared to the initial weight at the start of the refrigeration.

Next, the steamed, cooled shapes are cut into slices which do not exceed 3/16 of an inch in maximum thickness. These slices are then air dried at room temperature until they achieve a brittle consistency. Drying temperature is maintained at about 90° F.

It is observed that the so-dried slices can be stored indefinitely. When it is desired to form final products of the invention, the dried slices are inserted into an oil bath maintained at a temperature in the range of from about 360° to 370° F. In a period of time, usually less than about 10 seconds, the individual slices completely pop or puff, usually from the outside edge of the slice inward toward the center. The popped or puffed slice has a thickness of approximately four times that of the original slice. It is observed that during the final cooking the chips absorb very little of the hot oil as demonstrated by the fact that the same oil can be used without replenishment to cook an indefinitely large number of chips.

*Examples 9–11.*—In the following examples, the same procedure as described in Example 8 is used to prepare products of the invention except that for each of the indicated ingredients used in the product described in Example 8, there is employed the indicated quantities of materials. The results are summarized in Table II below.

TABLE II

| Example No. | Amount of cold, fresh boiled water in ounces (about 90° F.) | Material used in place of Ex. 8 Wheat Starch | | Material used in place of Ex. 8 Tapioca Flour | | Amount of egg white (dry weight basis) in ounces | Amount of Baking Powder in ounces | Additives | |
|---|---|---|---|---|---|---|---|---|---|
| | | Type | Amount in ounces | Type | Amount in ounces | | | Type | Amount in ounces |
| 9 | 18.0 | Wheat | 16.0 | Tapioca | 16.0 | 0.5 | 0.6 | Salt | 1.5 |
| | | | | | | | | Monosodium Glutamate | 0.5 |
| 10 | 16.0 | Corn | 16.0 | Tapioca | 16.0 | 0.08 | 0.08 | Salt | 1.5 |
| | | | | | | | | Monosodium Glutamate | 0.5 |
| | | | | | | | | Shrimp | 8.0 |
| 11 | 8.0 | Potato | 16.0 | | | 0.04 | 0.03 | Salt | 0.01 |

Our invention has been found to be completely satisfactory for the accomplishment of the objects thereof and, while we have described preferred embodiments thereof, we wish it to be understood that the same is capable of modification without departure from the spirit and scope of the appended claims.

What we claim is:

1. A method for the preparation of a foodstuff intermediate comprising the steps of:

(a) making an aqueous, homogeneous mixture containing, for each quart of water, the following quantities of components (dry weight basis):

| | Ounces |
   |---|---|
   | Starch having a protein content less than 5% (based on total starch weight) | 25 to 45 |
   | Egg whites | 0.2 to 1.0 |
   | Baking powder | 0.3 to 1.0 |
   | Inert additives | 3.0 to 10.0 |

(b) heating said mixture at a temperature of from about 150° to 212° F. until said mixture becomes a self-supporting dough having a generally translucent appearance,
   (c) refrigerating said dough at a temperature substantially cooler than said heating temperature until said dough loses in the range of approximately two to 10 weight percent of its initial weight while maintaining an atmosphere having a moisture content equivalent to approximately a 55% to 85% relative humidity,
   (d) forming the resulting refrigerated dough into chip structures each having an average thickness not greater than about 3/16 inch in at least one dimension, and
   (e) drying said chip structures in an inert gaseous atmosphere at a temperature below about 125° F. until said chip structures have a brittle consistency.

2. A method for the preparation of a foodstuff intermediate comprising the steps set forth in claim 1 wherein the temperature range of the refrigerating step is 34° to 40° F.

3. A method for the preparation of a foodstuff intermediate comprising the steps of:

(a) mixing non-gelatinized starch, egg whites, baking powder and inert additives, respectively, together with water to produce a fluid mixture of batter-like consistency and which contains, for each quart of water, the following quantities of components (dry weight basis):

| | Ounces |
   |---|---|
   | Starch having a protein content of less than 5% (based on total starch weight) | 25 to 45 |
   | Egg whites | 0.2 to 1.0 |
   | Baking powder | 0.3 to 1.0 |
   | Inert additives | 3.0 to 10.0 |

(b) heating said mixture at a temperature of from about 150° to 212° F. until said mixture becomes a self-supporting dough having a generally translucent appearance,
   (c) refrigerating said dough at a temperature substantially cooler than said heating temperature until said dough loses in the range of approximately two to 10 weight percent of its initial weight while maintaining an atmosphere having a moisture content equivalent to approximately a 55% to 85% relative humidity,
   (d) forming the resulting refrigerated dough into chip structures each having an average thickness not greater than about 3/16 inch in at least one dimension, and
   (e) drying said chip structure in an inert gaseous atmosphere at a temperature below about 125° F. until said chip structures have a brittle consistency.

4. A method for the preparation of a foodstuff intermediate comprising the steps set forth in claim 3 wherein the temperature range of the refrigerating step is 34° to 40° F.

5. A method for preparing a food product comprising immersing the product of claim 1 into an edible hot oil maintained at a temperature of 350° to 400° F. for a period of time not exceeding five seconds.

References Cited by the Examiner

UNITED STATES PATENTS

| 1,926,347 | 9/1933 | Morrow | 99—81 |
| 2,168,246 | 8/1939 | Shepherd | 99—81 |
| 2,339,419 | 1/1944 | McKay | 99—81 |

A. LOUIS MONACELL, *Primary Examiner.*

RAYMOND N. JONES, *Examiner.*